Feb. 18, 1969        A. E. TSCHANZ        3,427,894
REMOTE CONTROL ASSEMBLY
Filed Dec. 8, 1966

INVENTOR.
August E. Tschanz
BY
Barnard, McGlynn & Reising
ATTORNEYS

# United States Patent Office 3,427,894
Patented Feb. 18, 1969

3,427,894
REMOTE CONTROL ASSEMBLY
August E. Tschanz, Birmingham, Mich., assignor to Teleflex Incorporated, North Wales, Pa., a corporation of Delaware
Filed Dec. 8, 1966, Ser. No. 600,207
U.S. Cl. 74—501  8 Claims
Int. Cl. F16c 1/26

ABSTRACT OF THE DISCLOSURE

A motion transmitting remote control assembly having a fitting for supporting the assembly in an aperture, the fitting including a flange for engaging one extremity of the aperture, a pair of flexible legs which pass through the aperture and present angulated end surfaces for engaging the other end of the aperture, the end surfaces being angulated to compensate for the various distances through various apertures in which the fitting may be disposed whereby the fitting may be snapped into and firmly retained in any one of various apertures which may have any one of various different distances therethrough.

---

This invention relates to a motion transmitting remote control assembly which is normally operated to control a device by transmitting tension or compression in a curved path by means of a flexible motion transmitting core element.

Remote control assemblies of the type with which the instant invention is particularly applicable typically include a conduit, which movably supports a motion transmitting core element, and fittings disposed on the conduit and adapted to be attached to a support structure. The motion transmitting core element may be of the rotary type or of the push-pull type. Such remote control assemblies are frequently utilized in aircraft, marine vehicles, and automobiles, or other similar equipment. For example, such remote control assemblies are frequently utilized as push-pull control assemblies in automobiles for positioning vents or controlling heaters, and the like. In such an installation, normally one end of the remote control assembly is attached in the dashboard or instrument panel area of the automobile while the other end is disposed adjacent the particular element to be controlled, such as a vent or heater. Frequently, one or both ends of the conduit passes through an aperture in a bulkhead and a fitting is disposed in the aperture to support the conduit in the bulkhead. In many of the prior art assemblies, the fitting which is disposed in the aperture in a bulkhead and supports the conduit does not allow for the differences or tolerances in the thickness of the bulkhead; that is, the distance through the aperture. Thus, it frequently occurs that the material forming the bulkhead in which the aperture is disposed will have a different thickness than anticipated (i.e., a different distance through the aperture than anticipated) such that the support fitting when disposed in the aperture will not firmly retain or support the conduit in the aperture.

Accordingly, it is an object and feature of this invention to provide a fitting of the type for supporting a conduit of a remote control assembly in an aperture and wherein the fitting firmly supports the conduit in the aperture because of the fact that the fitting is constructed so as to compensate for tolerances and the various distances through an aperture in a bulkhead, or the like.

A further object and feature of this invention is to provide a fitting of the type suitable for supporting a conduit of a remote control assembly and which includes means for moving through and retaining the fitting in any one of various apertures by engaging opposite extremities of such an aperture and wherein the aperture may have any one of various different distances therethrough.

Another object and feature of this invention is to provide a support fitting adapted to be inserted in an aperture and including stop means for engaging one extremity of an aperture to prevent the fitting from moving through the aperture as it is inserted therein and further including retaining means for moving through an aperture as the fitting is inserted therein and to engage the other extremity of the aperture for retaining the fitting in any one of various apertures which may have any one of various different distances therethrough.

In general, these and other objects and features of this invention may be attained in a remote control assembly including a conduit, a motion transmitting core element movably disposed in the conduit, and a support fitting disposed on the conduit for supporting the conduit in an aperture, or the like. The fitting is an integral plastic member and includes a flange for engaging one side of the bulkhead. A pair of legs are integrally attached to the fitting at a position spaced from the flange and extend in a cantilevered fashion toward the flange. Each leg terminates at an end surface which is in spaced relationship to the flange and the end surface is at an acute angle to the longitudinal axis of the conduit. In other words, each of the surfaces at the distal ends of the legs is disposed at an acute angle with the axis of an aperture in which the fitting may be disposed. Each of the legs has a tapered outer surface for facilitating movement of the legs through the aperture. Thus, the fitting may be moved through an aperture whereby the aperture moves the legs radially inward until the legs have moved through the aperture and the flange engages the bulkhead at one extremity of the aperture. Once the flange engages the bulkhead, the leg end surfaces, which are disposed at an acute angle with the longitudinal axis of the conduit, engage the other extremity of the aperture, and the distance through the aperture from one extremity to the other (i.e., through the bulkhead) determines what portion of the end surfaces engages the other extremity of the aperture. Thus, the surfaces at the outer ends of the legs compensate for the distance through the aperture so that the fitting may be disposed and firmly retained in any one of various different apertures which may have any one of various different distances therethrough. In addition, the end surfaces at the extremities of the legs are preferably irregularly shaped, such as by including grooves, to more firmly engage and retain the fitting in the aperture by preventing relative movement between the end surfaces and the extremity of the aperture in which the fitting is disposed.

Other objects and attendant advantages of the present invention will be readily appreciated as the same becomes better understood by reference to the following detailed description when considered in connection with the accompanying drawings wherein.

Figure 1:
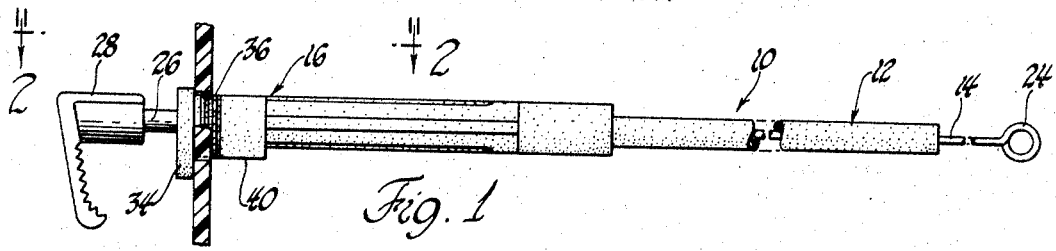
FIGURE 1 is a cross-sectional view partially broken away of a preferred embodiment of the instant invention.
Figure 2:
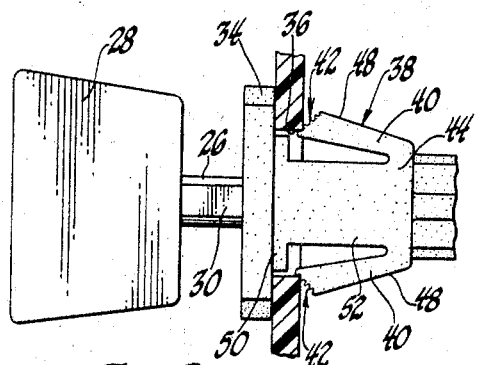
FIGURE 2 is an enlarged cross-sectional view taken substantially along line 2—2 of FIGURE 1.

Referring now to the drawings, wherein like numerals indicate like or corresponding parts throughout the several views, a remote control assembly utilizing the instant invention is generally indicated at 10. The remote control assembly 10 includes a conduit, generally indicated at 12, a motion transmitting core element 14, and a support fitting, generally indicated at 16.

Figure 6:
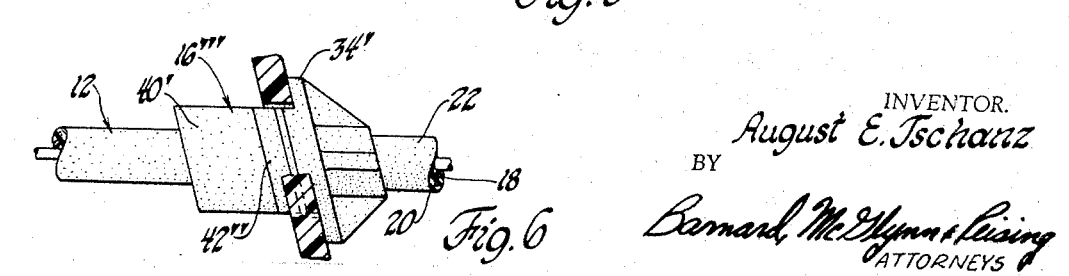
FIGURE 6 is a fragmentary cross-sectional view of an alternative embodiment of the fitting of the instant invention.

The conduit 12, as best illustrated in FIGURE 6, is preferably of the type including an inner tubular member 18 surrounded by a plurality of wire-like filaments 20 helically wrapped about the inner tubular member 18 on a long lead. A casing 22 is disposed about the filaments 20 and the inner tubular element 18. In the preferred embodiment, the inner tubular member 18 and the casing 22 are made of an organic polymeric material, such as polyethylene, nylon, or the like.

The core element 14 preferably comprises a wire including a loop 24 at one end for attachment to an element to be controlled. The wire-like core element 14 is connected to a slider 26 which in turn supports a manually graspable knob 28. The slider 26 is D-shaped since it has a flat surface 30 which in turn slides along the flat portion 32 of the bore in the support fitting 16.

The support fitting 16 is disposed on the conduit 12 and is preferably formed of an organic polymeric material such as an acetal resin, polyethylene, polypropylene, nylon, or the like. Preferably, the fitting 16 is molded about the conduit 12.

The support fitting 16 is disposed on the conduit 12 and includes means for moving through and retaining the fitting in any one of various apertures by engaging opposite extremities of such an aperture, the aperture being one having any one of various different distances therethrough and between the extremities thereof. More specifically, the fitting 16 includes a stop means comprising the flange 34 for engaging one extremity of an aperture, such as the aperture 36, to prevent the fitting from moving through the aperture 36 as the fitting is inserted or snapped therein. In addition, the fitting 16 includes retaining means, generally indicated at 38, for moving through the aperture 36 as the fitting is inserted therein and for engaging the other extremity of the aperture for retaining the fitting in any one of various apertures which may have any one of various different distances therethrough. The retaining means 38 comprises a pair of legs 40 which are flexible radially inward as the fitting is inserted in an aperture. Each of the legs includes an end surface, which is generally indicated at 42 and which is disposed at an acute angle with the axis of the aperture in which the fitting may be inserted for engaging the extremity of the aperture thereby to compensate for the variance in distance through different apertures whereby the fitting may be inserted and firmly retained in any one of various apertures which have various different distances therethrough. In the embodiment illustrated in FIGURE 5, a smooth end surface is indicated at 42'; however, in the preferred embodiment the end surface 42 of the legs is irregular and, more specifically, includes grooves.

Figure 3:
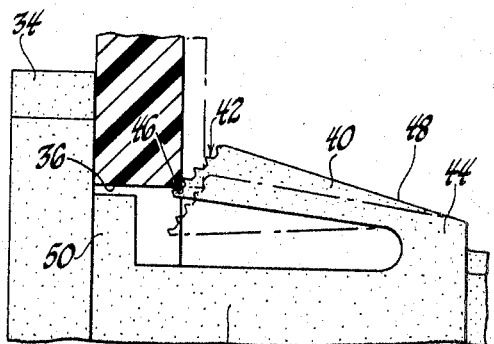
FIGURE 3 is an enlarged fragmentary cross-sectional view similar to FIGURE 2 but showing alternative positions of the preferred embodiment of the instant invention.
Figure 4:
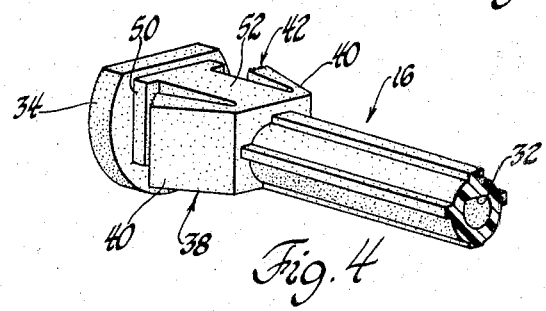
FIGURE 4 is a perspective view of the preferred embodiment of the instant invention.

The legs 40 extend generally toward the flanges 34 in a cantilevered fashion from a position indicated at 44 and which is spaced from the flange 34. The surfaces 42 and 42' are disposed in spaced relationship to the flange 34 so that when the fitting is inserted in an aperture, such as the aperture 36 the surfaces 42 engage the opposite extremity of the aperture 36. As illustrated in full lines in FIGURE 3, the surfaces 42 of the legs 40 engage the opposite extremity of the aperture 36, as indicated at 46. In the event the distance through the aperture 36 is greater, as indicated in phantom in FIGURE 3, the surface 42 will engage the other extremity of the aperture 36 at a different position as is illustrated in the phantom position of the leg 40 in FIGURE 3. Thus, the inclined or angulated end surfaces on the distal ends of the legs 40 compensate for the distances through the aperture so that the fitting may be disposed and firmly retained in any one of various apertures having any one of various distances therethrough. The grooves in the end surfaces of the legs 40 prevent relative movement between the end surfaces 42 and the other extremity of the aperture in the event a transverse force is exerted on the fitting. Without irregularities as grooves on the end surfaces, such a force could cause the legs 40 to move radially inward and into the aperture 36. As alluded to above, however, the surfaces 42 need not employ an irregular surface and may be smooth like the surfaces 42' illustrated in the embodiments of FIGURES 5 and 6 when such transverse forces are not likely to occur.

Each leg 40 has an outer tapered surface 48 which facilitates the movement of the legs through the aperture 36. In addition, the fitting 16 includes a central portion 50 which has an irregular cross-sectional configuration for being disposed within the aperture 36. More specifically, the central portion 50 is substantially rectangular and is disposed in a rectangular-shaped aperture 36, thereby preventing rotation of the fitting in the aperture. In addition, the fitting includes a body portion 52 which has a substantially rectangular cross section and the legs 40 are disposed in spaced relationship to opposite sides of the body portion 52.

Figure 5:
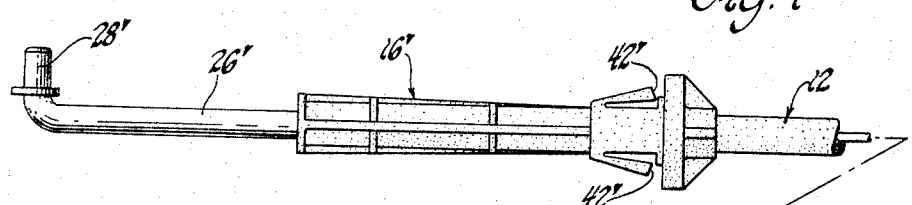
FIGURE 5 is a view disclosing an alternative configuration of a remote control assembly utilizing a fitting constructed in accordance with the instant invention.

The remote control assembly disclosed in FIGURE 5 differs from that disclosed in FIGURES 1 through 4 because the fittings 16' and 16" are molded to opposite ends of the conduit 12 and the fitting 16' movably supports a male slider member 26' which is adapted at 28' for connection to a control element or an element to be controlled and the fitting 16" includes a projecting portion which slidably supports the female slider member 26" which is in turn adapted to be connected to a control element or an element to be controlled at 28". Furthermore as set forth above, the fittings 16' and 16" include legs having end surfaces which are not irregularly shaped as indicated at 42'.

In the embodiment illustrated in FIGURE 6, the fitting 16''' includes a flange 34' and end surfaces 42" on the ends of the legs 40' which are inclined at an acute angle to the longitudinal axis of the conduit 12. Thus, in the embodiment illustrated in FIGURE 6, the conduit may be supported by the fitting 16''' in a bulkhead which is disposed at an acute angle to the longitudinal axis of the conduit at a position where the conduit passes through the bulkhead.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A remote control assembly comprising: a conduit; a motion transmitting core element movably disposed in said conduit; a support fitting for disposition in a non-circular aperture in a wall or the like which may have any one of various thicknesses, said fitting including a flange for engaging the wall at one extremity of the aperture to prevent the fitting from moving through the aperture as it is inserted therein, a body having a central portion adjacent said flange with a non-circular cross section to coact with at least a portion of the periphery of the aperture for preventing rotation of said fitting in the aperture, a pair of flexible legs extending generally toward said flange in a cantilevered fashion from said body at a location spaced from said flange for moving through the aperture as said fitting is inserted therein and to engage the wall at the other extremity of the aperture for retaining said fitting therein, said legs each terminating in a surface which is spaced from said flange, said surface being disposed at an acute angle to the axis of the aperture in which said fitting may be inserted to engage the wall of said other extremity of the aperture thereby to accommodate the wall thickness, said legs having tapered outer surfaces for facilitating movement thereof through the aperture.

2. A remote control assembly as set forth in claim 1 wherein said body includes a pair of parallel sides extending from said central portion, and each of said legs is disposed in spaced relationship to one of said sides.

3. A remote control assembly as set forth in claim 2 wherein at least a portion of said central portion is disposed radially outwardly from said sides.

4. A remote control assembly as set forth in claim 3 wherein said body has a substantially polygonal cross section.

5. A remote control assembly as set forth in claim 4 wherein said body has four sides which are perpendicular to one another and said legs are disposed in spaced relationship to opposite first and second sides thereof.

6. A remote control assembly as set forth in claim 5 wherein said central portion has four sides with two of the sides being disposed radially outwardly from said first and second sides.

7. A remote control assembly as set forth in claim 6 wherein the other two sides of said central portion are coplanar with the other two sides of said body.

8. A remote control assembly as set forth in claim 7 wherein said surfaces on said legs are grooved.

References Cited

UNITED STATES PATENTS

| | | | |
|---|---|---|---|
| 2,424,757 | 7/1947 | Klumpp. | |
| 2,869,905 | 1/1959 | Bratz | 285—162 X |
| 3,101,205 | 8/1963 | Benham | 285—162 |
| 3,213,189 | 10/1965 | Mitchell et al. | 339—128 X |
| 3,246,320 | 4/1966 | Houbolt | 339—128 X |
| 3,305,823 | 2/1967 | Dahlhaus et al. | 339—128 X |
| 3,348,427 | 10/1967 | Wilkey | 74—502 |

FRED C. MATTERN, Jr., *Primary Examiner.*

C. F. GREEN, *Assistant Examiner.*

U.S. Cl. X.R

285—162